Aug. 31, 1937.  P. KRUSE  2,091,323
CAN TESTING MACHINE
Filed Aug. 28, 1935
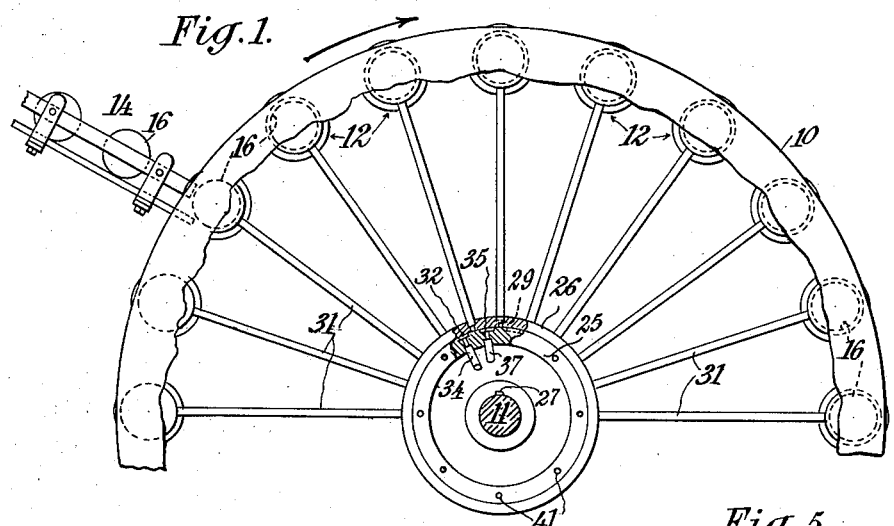
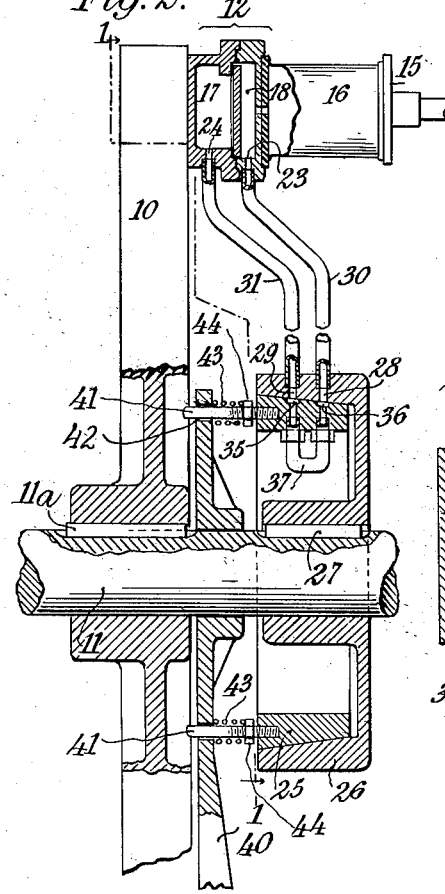
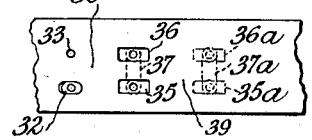
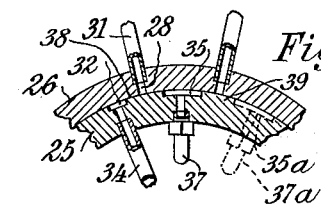
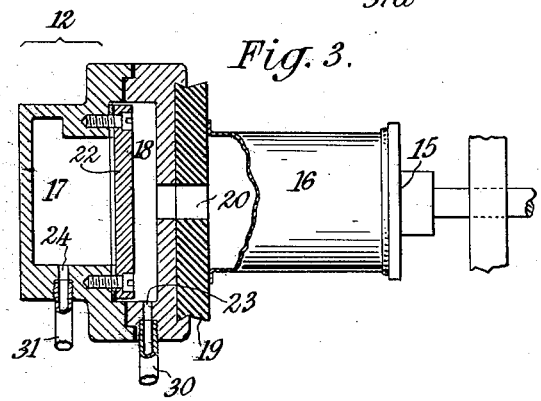
INVENTOR
Peter Kruse,
BY
Fraser, Myers & Manley
ATTORNEYS.

Patented Aug. 31, 1937

2,091,323

UNITED STATES PATENT OFFICE 2,091,323

CAN TESTING MACHINE

Peter Kruse, Brooklyn, N. Y., assignor to E. W. Bliss Company, Brooklyn, N. Y., a corporation of Delaware Application August 28, 1935, Serial No. 38,177

6 Claims. (Cl. 73—51)

This invention relates to machines for testing sheet metal cans or similar receptacles, and more particularly to a distributing valve for controlling the supply of fluid to the test parts of such a machine; and for equalizing the pressures in the latter.

The general method of testing cans involves subjecting them to a definite fluid pressure, either positive or negative, and measuring the leakage. Generally this is done by filling the can and a standard chamber with air at a definite pressure, and then balancing the pressure in one against the pressure in the other. Any leakage of air from the can, thus indicating a defect therein, will upset the pressure balance; and the resulting unbalanced pressure may be utilized to operate any suitable leak detecting mechanism. A can testing machine of this type is shown in my Patents Nos. 779,719 and 1,873,602, to which reference may be had for a more complete description of the can testing process.

The leak detecting mechanism is operated by the loss of pressure from the can chamber, i. e., by a pressure difference; and its sensitivity is measured by the magnitude of the pressure difference to which it responds. Thus, if the pressures in the can and standard chambers are not initially balanced, a false pressure difference is established. Consequently, the leak detector must be designed to respond to a pressure difference which exceeds this false one. Therefore, the sensitivity of the can testing machine, as a whole, bears a direct relationship to the initial pressure equalization, becoming more sensitive as a perfect pressure balance is approached.

Theoretically, when the can and standard chambers are filled with a fluid from the same source, pressure equalization, or a perfect balance, should be attained. However, in practice, this desiderata is not attained; and since it cannot be satisfactorily accomplished during the filling process, other means must be resorted to.

The principal object of the invention is to achieve an equalization of the pressures in the standard chamber and the can chamber of a can testing machine. This I preferably accomplish by first separately charging the can and the standard chamber with air from the same source, thereby approaching a pressure balance. The supply is then cut off, and a passageway which extends between the can and the standard chamber is opened. The latter step, of course, places the two parts in communication, whereupon any pressure difference is immediately destroyed, and a perfect balance, or equalization results.

Other objects and various features of the invention will be more apparent from the following description when read in connection with the accompanying drawing in which—

Figure 1 is an elevational view, partly in section and somewhat diagrammatic, showing a can testing machine which incorporates the filling and balancing principle of my invention; the view being taken on the line 1—1 of Fig. 2.

Fig. 2 is a fragmentary view on an enlarged scale and partly in section, of a portion of the can testing machine of Fig. 1.

Fig. 3 is a fragmentary view, partly in section, of a testing pot and illustrates the manner in which a can is balanced against a standard chamber.

Fig. 4 is an enlarged fragmentary view of a portion of the valve mechanism of Fig. 1.

Fig. 5 is a developed plan view of a portion of the valve mechanism of Fig. 4.

With reference to the drawing, particularly Figs. 1 and 2, the machine comprises a carrier wheel 10 which may be rotated at a desired speed by any well known mechanism (not shown) upon a central shaft 11 to which it is suitably keyed at 11a. The wheel 10 carries a succession of testing pots 12 which, preferably, are disposed radially on the face of the wheel along the outer circumference thereof; and the machine is rotated, either continuously or intermittently, to bring these testing pots successively into coincidence with a feed-in chute 14, of well known form, whereby a can may be deposited on each pot. The wheel also carries a plurality of plungers 15 each of which is axially coincident with one of the testing pots 12. Each of these plungers is adapted, upon the feeding in of a can 16, to press it against its associated testing pot; and to hold it there during the major part of a revolution of the wheel.

Each testing pot, as will be seen in Fig. 3, comprises a standard chamber 17 and a can chamber 18. The can chamber is provided with a pad 19, made of rubber or other suitable material, against which the open end of a can may be pressed, by the plunger 15, to provide a leakproof joint therebetween. Communication between the can 16 and chamber 18 is had through the hole 20. Thus, when the can is properly seated upon the pad 19 it, in effect, becomes a part of the can chamber 18. The chambers 17 and 18 may be separated in any preferred manner, as for example, by means of a solid wall 22. Further, the chambers 17 and 18 are provided with suitable openings 23 and 24 through which a fluid under pressure may be supplied in a manner hereinafter to be described. The particular pot herein shown and described may be varied in any desired fashion, since it, per se, forms no part of the present invention. It is only essential, insofar as the present invention is concerned, that the machine include a standard chamber, and means which will cooperate with a can to form a can chamber, which chambers are provided with suitable openings giving access to a source of fluid. For a more detailed description and illustration of the foregoing parts and their operative relationship reference may be had to my aforementioned patents.

For the purpose of supplying fluid to the different chambers of the testing pots, and for equalizing the pressures therein, I provide a valve comprising a fixed or supply member 25 which is disposed coaxially with the shaft 11 and supported, as will hereinafter be described, by any suitable frame 40; and an annular distributor, or movable member, 26 which is concentric to the fixed member and rotates thereon, the distributor being attached to the shaft 11 by means of a key 27, or other appropriate device, so that it may rotate in synchronism with the carrier wheel 10. Preferably, the members are of complemental frusto conical shape, and in order to maintain their peripheral faces in leakproof engagement, one of them should be yieldably pressed against the other. This may be done in any desired way, as for example, by providing the fixed member with a plurality of supporting studs 41 which pass through suitable openings 42 in the supporting frame 40; and suitable springs 43 which are held in compression between the frame 40 and adjusting nuts 44 suitably threaded to the studs. The springs, of course, tend to maintain the members in constant engagement; and the degree of pressure may be varied by an adjustment of the nuts 44.

The distributor is provided with a series of sets of distributing ports 28 and 29, there being one set for each of the testing pots 12 hereinbefore described. These ports connect, through pipes 30 and 31, with the openings 23 and 24 of the can chamber 18 and the standard chamber 17, respectively. Similarly, the supply member (see Fig. 5, which shows a development of a part of the face thereof) is provided with a plurality of sets of ports which, upon the rotation of the distributor 26, will register successively with the ports of the latter.

The first set of ports in the fixed member, 32—33, which may be termed the charging ports, are connected through a suitable pipe 34 with any desired source (not shown) of fluid, such as air for example; and this fluid may be under either positive or negative pressure. The areas of these charging ports will usually be determined by the relative volumes of the can and standard chambers. Thus, the port 32 which feeds the can chamber is made somewhat larger than the port 33 which feeds the standard chamber.

Immediately succeeding the charging ports I provide a second port, or set of ports, which may be termed as "equalizing" port or ports. If desired, this port may comprise a single groove which extends axially along the peripheral face of the fixed member for a distance equal to the axial distance between the outer edges of the ports 32 and 33. However, such a port would considerably reduce the bearing area of the face of the fixed member at that particular point, and, hence, might result in undue wear. Consequently, I preferably form the "equalizing" port, or ports, as two relatively narrow ports 35 and 36 which are interconnected by means of a tube 37. Obviously, a hole drilled through the side wall of the fixed member 25, and suitably plugged at its ends, would constitute a full equivalent of the tube 37; as would likewise the single groove as hereinbefore described. Therefore, where the term "equalizing port" or "ports" is used, it is intended to refer to an equivalent of the arrangement shown in Figs. 2 and 5.

In operation, when the rotation of the distributor 26 brings the ports 28 and 29 thereof, into registry with the charging ports 32 and 33, respectively, of the supply member, fluid will be supplied through the pipes 30 and 31 to the can and standard chambers, respectively. This flow will, of course, continue until such time as the ports 28 and 29 move out of registry with the charging ports and encounter the cut-off 38. Further rotation of the distributor will bring the ports 28 and 29 into registry with the equalizing ports 35 and 36, respectively, whereby the now charged chambers 18 and 17 may be placed in communication through the tube 37. As a result, any fluid pressure difference between the chambers, which may have been established during the charging operation, will be completely destroyed, and a perfect pressure balance will result.

The arcuate length of the equalizing ports is usually determined by the arcuate spacing of the sets of distributor ports. Preferably this length should be less than the arcuate distance between any two sets of distributing ports; or stated differently, the arcuate distance between any two sets of distributing ports should, preferably, be greater than the arcuate length of the equalizing ports. Otherwise, the ports 28 and 29 of two or more potheads would coincidently register with an equalizing port, thereby placing the can and standard chambers of both pots in communication. Consequently, if one testing pot was not in use, or if its can was excessively leaky, the test of the can on the other pot would be destroyed. If this length, in any particular machine, is not adequate to allow a complete pressure equalization, a second set of equalizing ports, designated 35a and 36a, and provided with an interconnecting pipe 37a, all as shown in dotted lines in Figs. 4 and 5, may be provided. Thus, the ports 28 and 29, after registering with the ports 35 and 36, will pass over an intermediate cut-off 39 and then move into registry with the second set of equalizing ports 35a and 36a just referred to. In a similar manner further equalizing ports may be provided wherever this is found necessary to the achievement of the desired pressure equalization.

The supply member may be provided, if desired, with a further set of ports (not shown) the function of which is to relieve the pressure in the standard and can testing chambers at appropriate times; and other ports may be provided for any other necessary or desired purposes. It is only essential to the present invention that the fixed member be provided with charging ports and balancing ports as hereinbefore described.

Considering the complete cycle of operation with respect to any particular testing pot, it is apparent that a can 16 will be deposited thereon from the chute 14 and will be held in airtight relation with the can chamber 18 by means of the plunger 15, all as described in one of the aforementioned patents. The rotation of the carrier, and hence the distributor, will then bring the distributing ports 28 and 29, corresponding to this particular testing pot, successively into register with the charging ports 32—33, the cut-off 38, and the equalizing ports 35—36; and, where used, the cut-off 39, and the equalizing ports 35a and 36a. Any pressure difference which was established during the charging operations will, as was hereinbefore described, be wiped out when the two chambers are placed in communication through the equalizing ports. During substantially the remainder of any single revolution of the wheel 10, the two chambers of the testing pot will be completely independent, that is, fluid is neither supplied thereto, nor are the chambers placed in communication. Hence, any leakage of fluid from the can will result in an upsetting of the pressure balance; and this pressure change may be used to operate any desired form of detecting and/or ejecting mechanism.

The use of the equalizing ports has been found to result in an almost perfect initial pressure equalization; and consequently, the detecting, or ejecting mechanism, may be made extremely sensitive, that is, it may be made to respond to an extremely small pressure drop. Thus, the use of the charging and equalizing valve of the invention results in a more sensitive can testing machine.

While I have shown and described a valve mechanism having a fixed member of frusto conical shape, and a distributor member which rides on the peripheral face thereof, it is quite apparent that circular members having the flat faces thereof, rather than the peripheral faces, in contact, could readily be substituted; and that charging and equalizing ports, in accordance with this invention, could be provided therein. Thus since certain changes may be made in the invention without in any way departing from the scope thereof, it is to be understood that the foregoing matter shall be construed in a descriptive rather than in a limiting sense.

What I claim is:

1. In a can testing machine of the type which includes a standard chamber and a can chamber, a charging valve, said valve comprising a supply member, and a distributing member which is relatively rotatable with respect to the supply member, the supply member being provided with a set of charging ports which communicate with a source of fluid under pressure, and a set of equalizing ports separate from and independent of the charging ports, the distributor member being provided with a set of distributing ports one of which communicates with the standard chamber and another of which communicates with the can chamber, the set of distributing ports, upon the relative rotation of the distributor member with respect to the supply member, being adapted to register successively and independently, first with the set of charging ports and then with the set of equalizing ports whereby the chambers may be first separately charged with fluid, and then placed in pressure equalizing relation.

2. In a can testing machine of the type which includes a testing pot having a standard chamber and a can chamber, a valve, said valve comprising a fixed member, and a distributing member which is adapted to rotate on the fixed member, said fixed member having a first set of ports which communicate with a source of fluid under pressure, and a second set of ports which are interconnected but separated from said first set, said distributing member having a set of ports one of which communicates with the standard chamber and another of which communicates with the can chamber, the ports of said distributing member, upon the rotation thereof, being adapted to register successively with the first and second sets of ports of said fixed member whereby the chambers may be first separately charged with fluid under pressure and then placed in pressure equalizing relationship.

3. In a can testing machine, a rotating carrier, a plurality of testing pots on said carrier each comprising a standard chamber and a can chamber, and a charging valve, said valve comprising a fixed member and a distributor member which is adapted to rotate on the fixed member, said fixed member having a first set of ports which communicate with a source of fluid under pressure and a second set of ports which are interconnected but spaced from the first mentioned set of ports, said distributor member having a plurality of sets of ports each of which serves one of said testing pots and each set having one port in communication with the standard chamber and another port in communication with the can chamber of its respective pot, each set of ports of said distributor member being adapted to register successively and independently with each of the sets of ports of said fixed member whereby the standard and can chambers of each pot are first separately charged with fluid under pressure and then placed in pressure equalizing communication.

4. In a can testing machine, a rotating carrier, a plurality of testing pots on said carrier, each of the pots comprising a standard chamber and a can chamber, and a charging valve, said valve comprising a fixed member and a distributor member which is adapted to rotate on the fixed member, said fixed member having a set of charging ports which communicate with a source of fluid under pressure, and a plurality of sets of equalizing ports, each of the sets of ports being spaced arcuately one from the other, said distributor member having a plurality of arcuately separated sets of ports, there being one set for each of said testing pots and each set having one port in communication with the standard chamber and another port in communication with the can chamber of its testing pot, whereby upon rotation of the distributor member each of its sets of ports may register successively with the charging and equalizing ports of the fixed member, the arcuate distance between the sets of ports in the distributor member being greater than the arcuate length of the ports in the fixed member, whereby no two sets of distributor ports may simultaneously register with any one set of ports in the fixed member.

5. In a can testing machine of the type which includes a standard chamber and a can chamber, a charging valve comprising a supply member having a set of charging ports which communicate with a source of fluid under pressure and a set of equalizing ports arcuately spaced from the charging ports, and a distributor member having a set of distributing ports one of which communicates with the can chamber and the other of which communicates with the standard chamber, said distributing member being mounted for rotation relative to the supply member with its ported face disposed in substantially leak-tight relation with the ported face of the supply member, whereby upon such relative rotation the distributing ports may register successively and independently, first with the charging ports and then with the equalizing ports.

6. In a can testing machine, a rotating carrier, a plurality of testing pots on said carrier each having a standard chamber and a can chamber, and a charging valve comprising a supply member of frusto-conical shape having on its peripheral face a set of charging ports and a set of equalizing ports arcuately spaced from the charging ports, and a distributing member mounted for rotation on said supply member with an inner peripheral face making leak-tight contact with the complemental face of the supply member, said distributor member having a plurality of arcuately separated sets of distributing ports, there being one set for each testing pot and each set having one port in communication with the can chamber and another port in communication with the standard chamber of its testing pot, whereby, upon rotation of the distributing member each set of distributing ports will successively and independently register first with the charging ports and then with the equalizing ports of the supply member.

PETER KRUSE.